Aug. 6, 1935.　　　　J. HUTCHINSON　　　　2,010,263
MOTOR OPERATED TRAIN INDICATOR
Original Filed Feb. 26, 1932　　8 Sheets-Sheet 1

INVENTOR.
Job Hutchinson.
BY
Stone, Boyden, Mack & Hahn,
ATTORNEYS

Aug. 6, 1935.   J. HUTCHINSON   2,010,263
MOTOR OPERATED TRAIN INDICATOR
Original Filed Feb. 26, 1932   8 Sheets-Sheet 3

INVENTOR
Job Hutchinson.
BY Stone, Boyden, Mack & Hahn
ATTORNEYS

Aug. 6, 1935.    J. HUTCHINSON    2,010,263
MOTOR OPERATED TRAIN INDICATOR
Original Filed Feb. 26, 1932    8 Sheets-Sheet 4

Aug. 6, 1935.  J. HUTCHINSON  2,010,263
MOTOR OPERATED TRAIN INDICATOR
Original Filed Feb. 26, 1932  8 Sheets-Sheet 5

INVENTOR.
Job Hutchinson.
BY
ATTORNEYS

Aug. 6, 1935.  J. HUTCHINSON  2,010,263
MOTOR OPERATED TRAIN INDICATOR
Original Filed Feb. 26, 1932   8 Sheets-Sheet 6
Fig. 6.
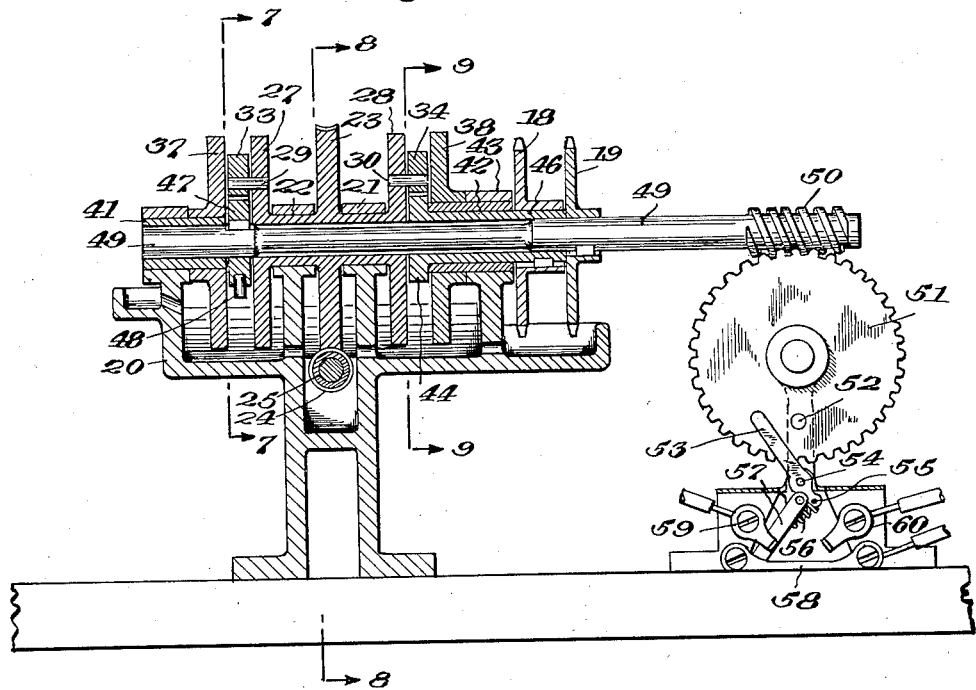
Fig. 7.
Fig. 8.
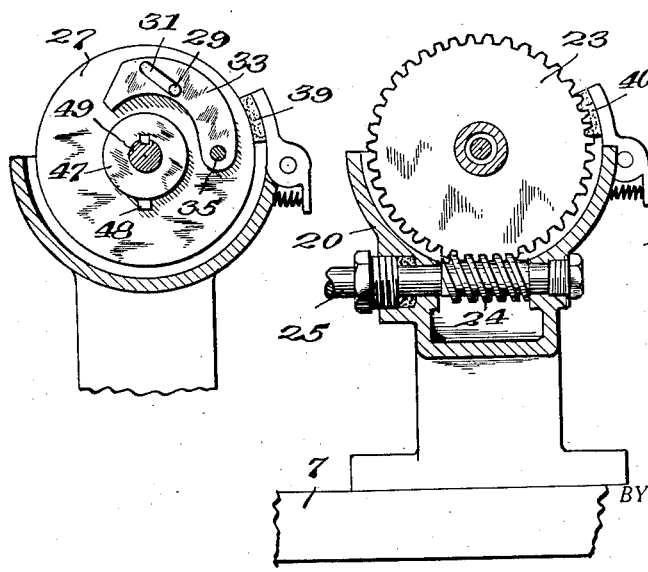
Fig. 9.
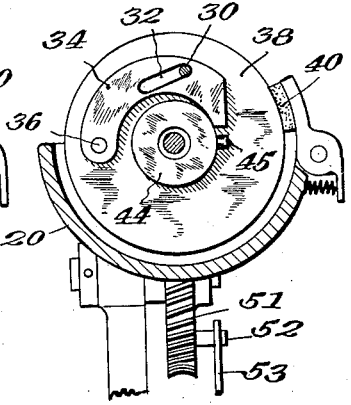
INVENTOR.
Job Hutchinson.
BY Stone, Boyden,
Mack & Hahn,
ATTORNEYS.

Aug. 6, 1935.  J. HUTCHINSON  2,010,263
MOTOR OPERATED TRAIN INDICATOR
Original Filed Feb. 26, 1932   8 Sheets-Sheet 7

INVENTOR.
Job Hutchinson.
BY
Stone, Boyden, Mack & Nahm,
ATTORNEYS

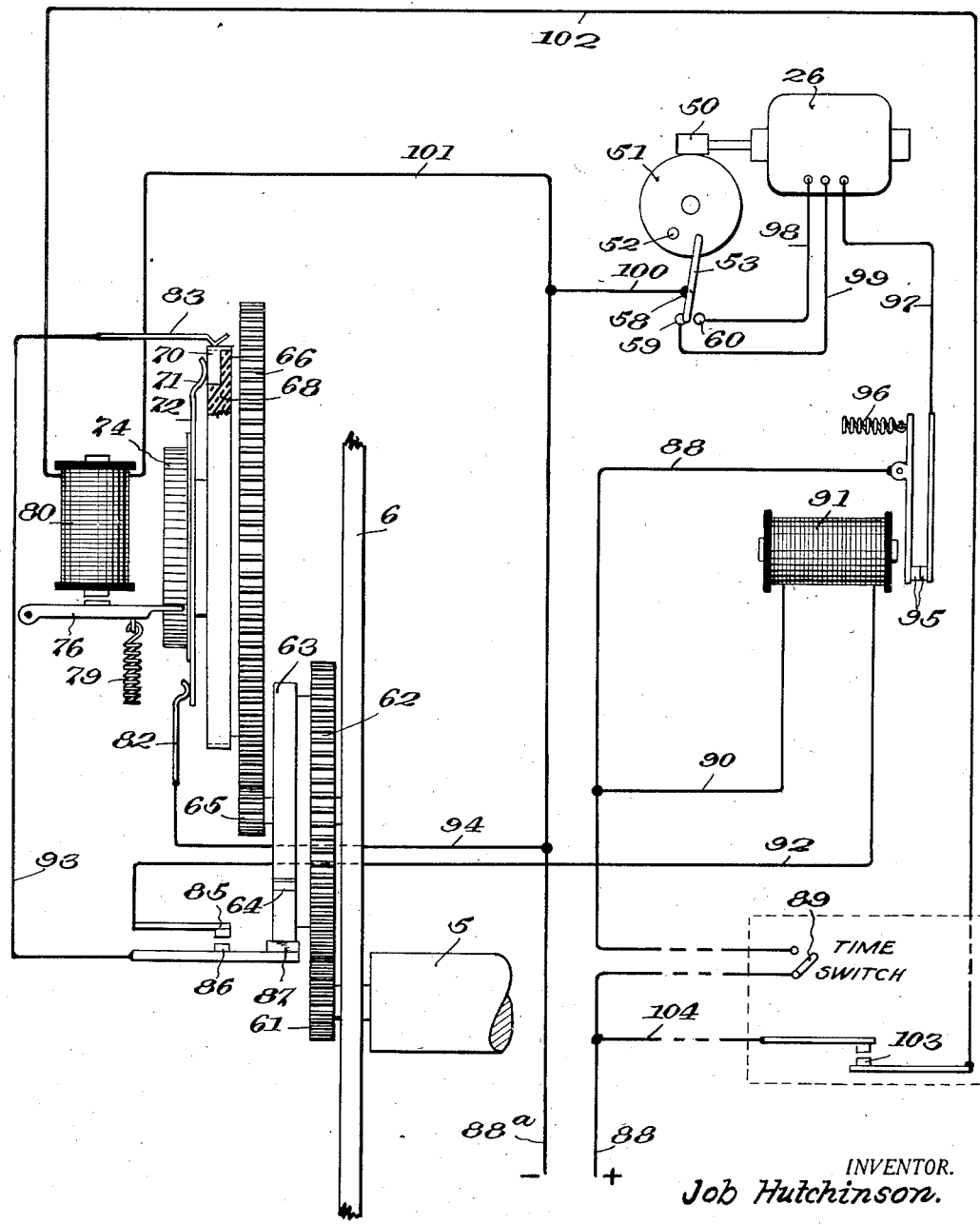

Patented Aug. 6, 1935

2,010,263

UNITED STATES PATENT OFFICE 2,010,263

MOTOR OPERATED TRAIN INDICATOR

Job Hutchinson, Great Neck, N. Y.

REISSUED

Application February 26, 1932, Serial No. 595,402
Renewed December 3, 1934

18 Claims. (Cl. 40—53)

This invention relates to display signs of the changeable exhibitor type and more particularly to those having special utility as train indicators employed to inform the public as to the location, destination and time of departure of trains leaving a station.

Such changeable exhibitors or train indicators have heretofore commonly been operated by hand, as by means of turning a crank or the like. This, of course, necessitates an attendant actually going to each point where an indicator is located in order to operate it.

The primary object of the present invention is to devise an improved power operated remote controlled system by means of which a changeable exhibitor may be shifted to any desired position from a distant point. This obviates the necessity of an attendant travelling from one indicator to another in order to set the same, as the various controls can, if desired, be grouped on a single panel or switchboard, at a central office. Moreover, it permits of the indicators being placed in inaccessible positions, such as above gateways or arches, where it would be difficult to manually operate them. The invention is, however, not limited to controlling an indicator from a distant point, as the remote control mechanism may, in many cases, be mounted in or on the post or column which supports the indicator. In this case, my improved system relieves the attendant of the often severe physical strain of manual operation, and also makes for speed and accuracy.

As will hereinafter more fully appear, the present invention employs some of the principles already set forth in my prior co-pending application, Serial No. 590,484, filed February 2, 1932, the actual construction being somewhat modified to better adapt the mechanism to the purposes for which it is intended.

In order that the invention may be readily understood, reference is had to the accompanying drawings, forming part of this specification, and in which:

Fig. 5 is a side elevation of this mechanism from the side opposite to that on which Fig. 3 is taken;

Fig. 6 is a longitudinal vertical section through the automatic reversing mechanism hereinafter described;

Figs. 7, 8 and 9 are transverse sections substantially on the lines 7—7, 8—8 and 9—9, respectively, of Fig. 6;

Figs. 10, 11, 12 and 13 are a longitudinal section, front elevation, plan and transverse section, respectively, of one form of remote control mechanism or selector device which I may employ; and Fig. 14 is a diagram of the circuits employed, also conventionally illustrating the essential parts of the control mechanism.

Figure 1:
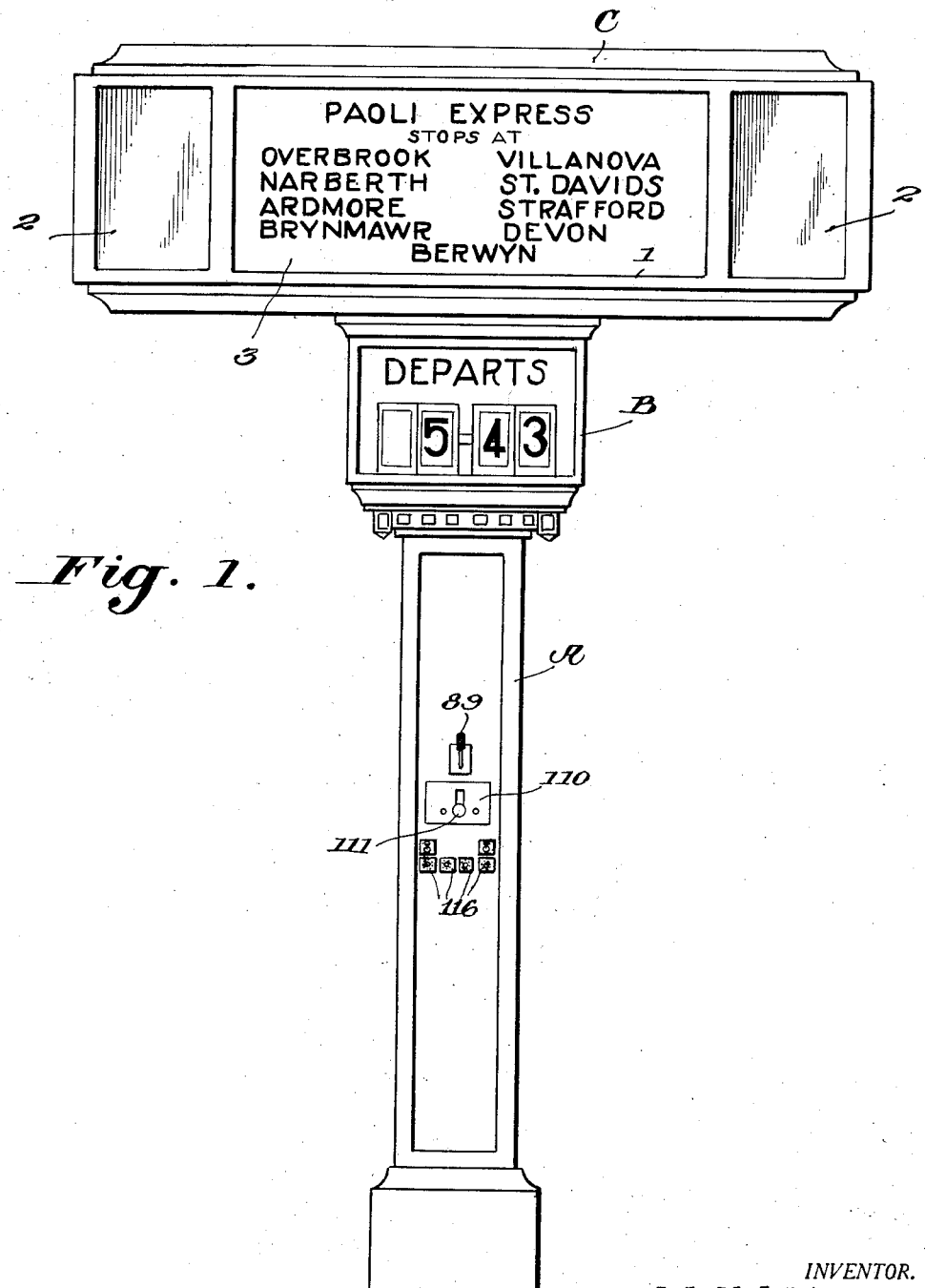
Fig. 1 is a front elevation of a typical indicator installation made in accordance with the invention and showing the remote control panel as mounted upon the column or pedestal which supports the indicator.
Figure 2:
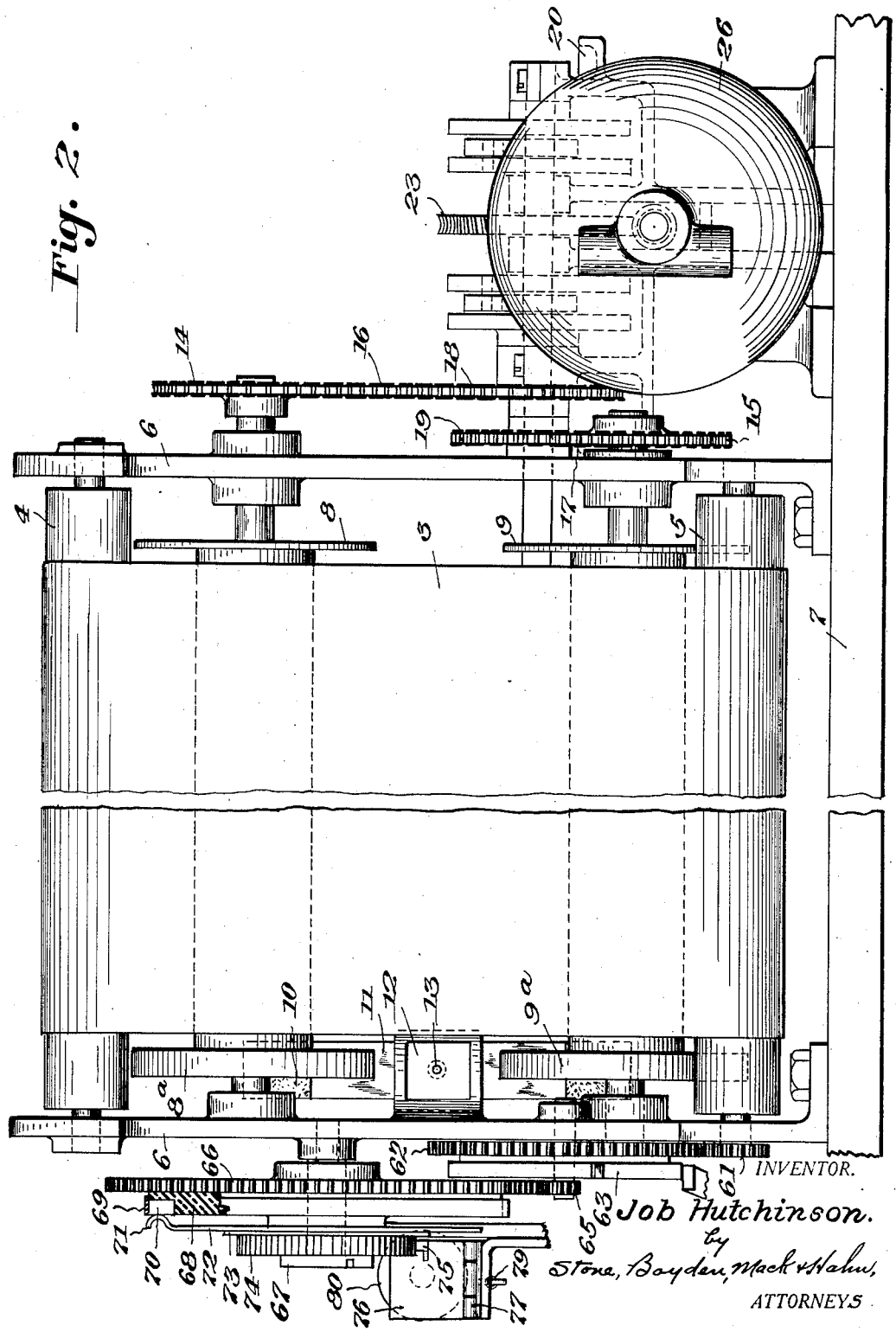
Fig. 2 is a front elevation on an enlarged scale, of the reels and web, motor and automatic control mechanism, parts being broken away.
Figure 3:
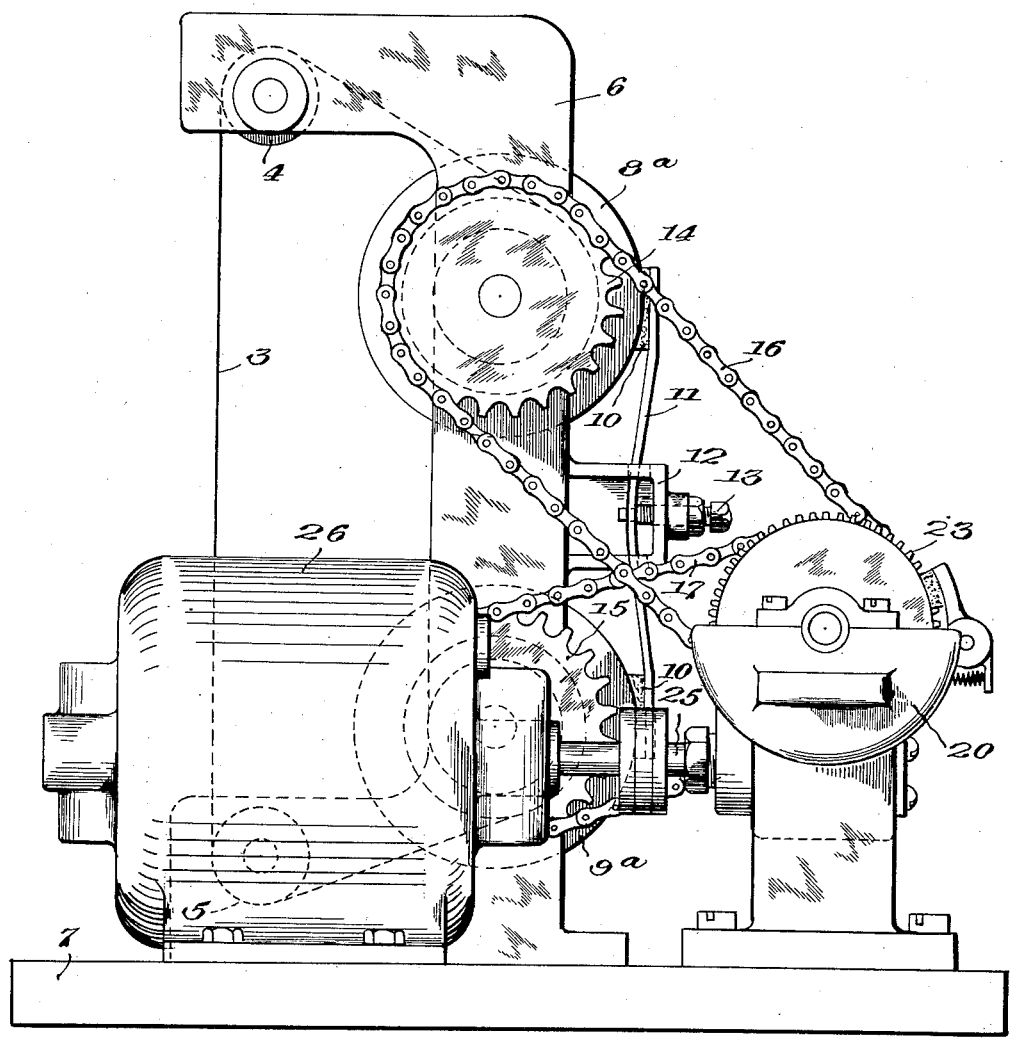
Fig. 3 is a side elevation of the mechanism shown in Fig. 2, looking from the motor side of the apparatus.
Figure 4:
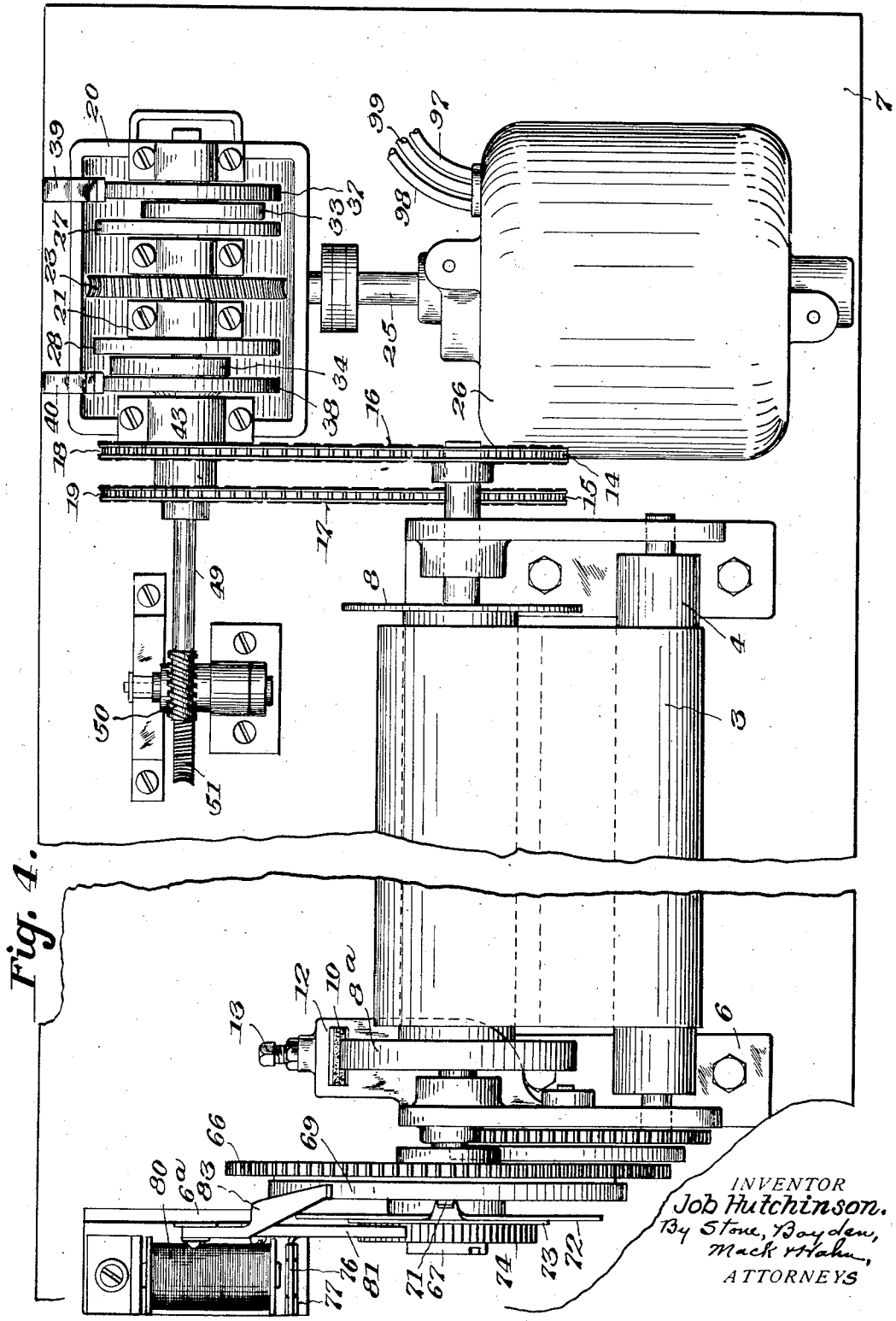
Fig. 4 is a plan view of the mechanism shown in Figs. 2 and 3.
Figure 5:
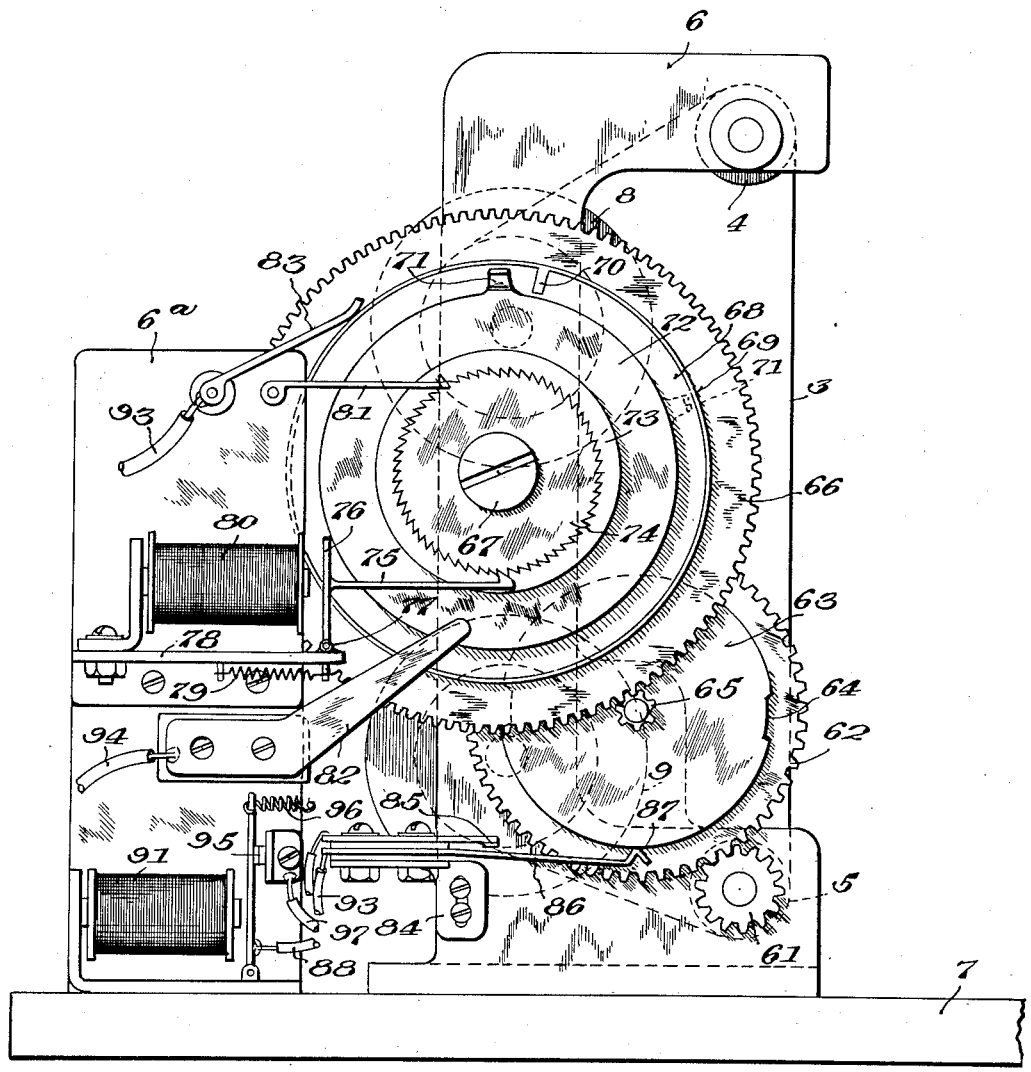
Figure 10:
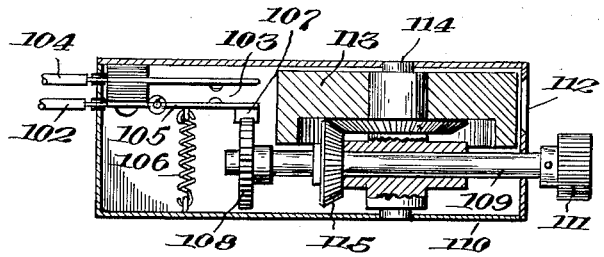
Figure 11:
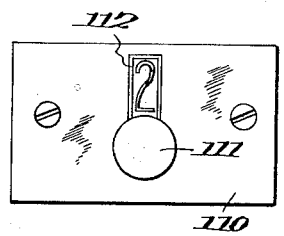
Figure 12:
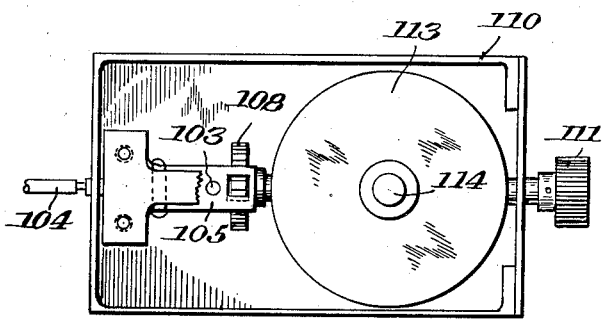

Referring to the drawings in detail, and first more particularly to Fig. 1, my improved apparatus comprises a post or pedestal A on which is supported a time indicator B and a train indicator proper C. This comprises an elongated casing having a central display opening 1, on each side of which is disposed a housing to contain the mechanism, the front of these housings preferably comprising panels 2. Mounted to move behind the display opening 1 is a web or curtain 3, on which appears a plurality of legends showing information concerning various trains.

The time indicator B, shown in Fig. 1, forms no part of the present invention, and may be of any suitable or desired construction, such, for example, as the identical electrically operated remote controlled system shown and described in my above identified prior copending application and hence no detailed description is necessary here.

Referring now to Figs. 2 to 5, inclusive, it will be seen that the web or curtain 3 passes around upper and lower guide rolls 4 and 5 and has its respective ends secured to and wound upon reels 8 and 9, the guide rolls 4 and 5 and the reels 8 and 9 being journalled in a suitable frame 6 mounted upon a base 7.

In order to prevent overrunning of these reels due to the inertia of the parts, I provide a friction brake comprising a pair of brake shoes 10 carried by a brake beam 11 supported in a bracket 12 and capable of being adjusted toward and from the reels by means of a set screw 13. The brake shoes 10 bear upon wide faced heads 8ª and 9ª, provided at one end of the reels 8 and 9, as shown.

Secured to the reel 8 is a sprocket wheel 14 and secured to the reel 9 is a sprocket wheel 15, and sprocket chains 16 and 17 connect these two sprockets respectively with another pair of sprocket wheels 18 and 19, (see Fig. 6), by means of which the reels are driven. My improved driving and reversing mechanism will now be described, reference being had to Figs. 6 to 9. By reference to these figures, it will be seen that I provide a combined supporting frame and oil pan 20, in bearings 21 of which is mounted a rotary member comprising a hollow shaft or sleeve 22, carrying at its center a worm wheel 23 and at its ends a pair of discs 27 and 28. The worm wheel 23 meshes with a worm 24, secured to a shaft 25, extending horizontally from an electric motor 26, of any suitable type. Set in the discs 27 and 28 and projecting in opposite directions therefrom are a pair of pins 29 and 30, which work freely in angularly disposed slots 31 and 32, formed in dogs 33 and 34, which are pivotally mounted at one end by pins 35 and 36, on discs 37 and 38, respectively. Spring pressed friction brakes 39 and 40 bear lightly against the peripheries of the discs 37 and 38, to prevent their free rotation.

The disc 37 is mounted to rotate on a bearing sleeve 41, carried by the frame 20, and the disc 38 is mounted to rotate on a similar sleeve 42, held by bearing cap 43.

Another sleeve 46 is journalled inside of the sleeve 42 and carries at one end between the discs 28 and 38 a flange 44 having a short radial pin or lug 45, projecting from the periphery thereof, (see Fig. 9). At its opposite end, the sleeve 46 is keyed to the sprocket wheel 18, above mentioned. Another disc or flange 47 similar to the flange 44, and having a radiallly projecting pin 48 is disposed adjacent but slightly spaced from the disc 37, and is keyed to a shaft 49 extending centrally through all of the mechanism just described and journalled in the sleeves 41 and 46. To this shaft 49 is also keyed the sprocket wheel 19.

From the foregoing, it will be understood that the disc or flange 44 is confined between the discs 28 and 38 and lies in the plane of the dog 34, while the disc or flange 47 is confined between the discs 27 and 37, and lies in the plane of the dog 33. It will also be observed that when the rotary member comprising the discs 27 and 28 turns in one direction, as for example, clockwise, as viewed in Fig. 9, the pin 30 will ride to the outer end of the slot 32, thus swinging the dog 34 inwardly about its pivot 36 so that its nose engages the pin 45, and further rotation in this direction thus causes the flange 44, and with it the sprocket wheel 18, to be driven through such dog and pin. This rotates the reel 8 in such a direction as to wind the web thereon. At the same time, the reel 9 is rotated in the opposite direction by reason of the web being drawn therefrom, and this rotation is imparted through the sprocket wheels 15 and 19 to the shaft 49 and disc or flange 47. It will be noted that such rotation of the shaft 49 is in the reverse or counter clockwise direction, as viewed in Fig. 7, and that with the parts in the position shown, the pin 48 is free to rotate under the dog 33, and does not engage the same.

If the motor runs in the opposite direction, so as to reverse the direction of rotation of the discs 27 and 28, the pin 29 on the disc 27 will move in a counter-clockwise direction, as viewed in Fig. 7, and will travel to the outer and upper end of the slot 31, swinging the dog 33 inwardly, while at the same time, the pin 30 on the disc 38, being shifted in the same direction, will lift the dog 34 outwardly and cause its nose to clear the pin 45. Further rotation of the discs 27 and 28 in a counter-clockwise direction will result in the disc or flange 47 and shaft 49 being driven through the dog 33 and pin 48, in a counter-clockwise direction, and the sprocket wheel 19 will thus be rotated to drive the reel 9 in such a direction as to wind the web thereon, while at the same time the reel 8 is permitted to turn, as the web is drawn therefrom.

Thus, it will be seen that I have provided automatic reversing mechanism comprising a pair of oppositely disposed one way clutches, so arranged that when the motor runs in one direction, one of the reels will be driven, while the other is permitted to freely unwind, and when the motor runs in the opposite direction, the other reel will be driven, and the first permitted to freely unwind, the drive being automatically shifted from one reel to the other, in accordance with the direction of rotation of the motor.

In addition to the automatic clutch mechanism above described, I provide means for reversing the motor itself, when the web is nearly all unwound from one of the reels, as in my said prior copending application, Serial No. 590,484. In the present case, I employ an automatic reversing switch driven by means of a worm 50 on the end of the shaft 49, and meshing with a worm wheel 51. Projecting from the side of this worm wheel is a pin 52, adapted to engage and move a lever 53, pivoted at 54, and also pivotally connected with a switch blade 57, a compression spring 56 being interposed between such switch blade and a projecting finger 55 on the lever 53, in order to give a snap action to the switch. The switch member 57, when swung from one position to the other, is adapted to connect contacts 59 and 60 respectively with a common contact 58, and thus control two separate circuits, as will be hereinafter more fully described.

When the motor is running in one direction and the drive is through sprocket 19, the shaft 49 turns with it, and thus operates the reversing switch as described. But when the motor is running in the opposite direction and the drive is through sprocket 18, the reel from which the web is unwinding will act through its sprocket chain 17 and wheel 19 to rotate the shaft 49 reversely, and thus operate the reversing switch again when the limit of travel is reached in that direction.

The automatic control mechanism for properly positioning the web so as to bring any desired legend thereon into registry with the display opening is arranged at the opposite side of the web from the motor 26, and is of the step-by-step selector type. It comprises a pinion 61, secured to the guide roll 5, and meshing with a gear 62, which carries a disc 63 having a pair of notches 64, cut in its periphery at diametrically opposite points thereof. The gear wheel 62 is mounted for rotation on the frame 6 and is rigidly connected with a small pinion 65, meshing with a large gear wheel 66, mounted for rotation on a pin 67, carried by the frame 6. Rigidly secured to the gear wheel 66 is an insulating disc 68 having around its periphery a metallic band 69 serving as a slip ring, from which band radially projects an inwardly extending lug or finger 70. A cooperating finger or contact 71 carried by a disc 72 movable independently of the wheel 66 about the pin 67 is arranged to wipe over the face of the disc 68 and to engage the lug or finger 70 so as to establish an electrical connection therewith.

Rigidly secured to the disc 72 but insulated therefrom by an insulating washer 73 is a ratchet wheel 74. Cooperating with this ratchet wheel is a resilient pawl 75 carried by a member 76, pivotally mounted at 77 on a bracket 78 secured to a portion 6ª of the frame and constituting the armature of an electromagnet 80. This armature is urged away from the magnet by a suitable spring, as indicated at 79. It will thus be understood that whenever the magnet 80 is energized, the pawl 75 moves the ratchet wheel 74 and disc 72 around in a clockwise direction, a distance of one tooth. A holding pawl 81 also engages the teeth of the ratchet wheel to prevent reverse rotation thereof.

Bearing upon the disc 72 is a spring finger or brush 82, and bearing upon the band 69 is a spring finger or brush 83, these being connected by wires 93 and 94 to other elements of the control system, as will be hereinafter more fully described.

In addition to the contacts 70 and 71, I provide another pair of contacts 85 and 86, these latter being preferably in the form of spring strips insulated from each other and suitably mounted upon the frame by means of an adjustable bracket 84. One of these contact strips, such as 86, is extended and preferably bent at its end, as indicated at 87, to form a finger which rides upon the periphery of the disc 63, and which is adapted to drop into the notches 64, as this disc rotates. It will be further seen that when the finger 87 drops into a notch 64, the contacts 85 and 86 are closed, establishing an electric connection between them.

The above described circuit closer controlled by the finger which rides upon the periphery of the notched disc 63 is similar to that employed in my said prior copending application, and has a similar function. In that case, however, such circuit closer cooperates with an arm sweeping over a stationary commutator, while in the present case, it cooperates with the movable contacts of my improved step-by-step selector.

Referring now to Fig. 14, 88 and 88ª designate the terminals of a suitable source of current. One of these terminals, as 88, is connected through a switch 89 and wire 90, with a control magnet or relay 91, the other side of this magnet being connected by a wire 92 with the contact 85, and the contact 86 being connected by a wire 93, with the contact finger 83. The contact finger 82 is in turn connected by a wire 94 with the other side of the line or source of current.

The magnet 91, when energized, serves to open a switch or pair of contacts 95, normally held closed by means of a spring 96. One side of the line 88 is connected through the switch 89, with one of the contacts 95, while the other contact is connected by a wire 97, to the motor 25. Two other leads 98 and 99 extend from the motor to the respective terminals 59 and 60 of the reversing switch 53, the common terminal 58 thereof being connected by a wire 100, with the other side 88ª of the line.

One terminal of the magnet 80 is connected by wire 101 with one side of the line 88ª and the other terminal is connected by a wire 102, to one member of a circuit closer 103, the other member of which is connected by wire 104 to the other side of the line 88.

Figure 13:
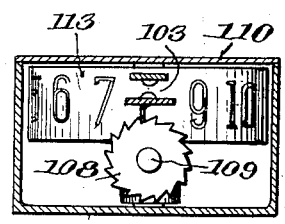

By reference to Figs. 10 to 13, inclusive, the nature and method of operation of the circuit closer 103 will be understood. This circuit closer preferably consists of a pair of conducting strips carried by an insulating bracket, the lower one 105 being pivotally mounted and pulled downwardly by a spring 106. The end of this arm 105 carries a lug 107, which rides upon a cam or toothed wheel 108, secured to a shaft 109, journalled in bearings in a housing or cabinet 110. The other end of the shaft 109 projects through the wall of this cabinet and has a knob or hand wheel 111 secured thereto. Adjacent this knob in the front wall of the cabinet is a sight opening 112, and behind this sight opening is mounted to rotate on a shaft 114 an indicator wheel 113, having a series of numbers on its periphery, as shown in Fig. 13. This indicator wheel, circuit closer, and associated parts, may be designated a selector device.

From the foregoing, it will be seen that when the knob 111 is turned, the toothed wheel 108 serves to operate the circuit closer 103 and to close the circuit momentarily every time a tooth passes under the lug 107. The closer of the circuit at 103 energizes the magnet 80 over the circuit 101, 102 and 104, as above described, and each impulse of current flowing through this magnet causes it to attract its armature 76 and through the pawl 75 to step the ratchet wheel 74 around a unit distance. Assuming the indicator wheel 113 to be set at zero, and assuming that it is desired to transmit to the magnet 80 a given number of impulses, the knob 111 is turned until the digit on the wheel 113 corresponding to the number of impulses desired, appears at the window 112. When this occurs, the operator knows that the corresponding number of impulses has been sent, and that the ratchet wheel 74 has been stepped around a corresponding distance.

A general description of the operation of my improved apparatus will now be appended. It will be understood that the number and position of the characters or digits on the indicator wheel 113 of the selector device correspond with the position of the various legends or train information appearing on the web 3. Thus, if the web contains thirty different legends or spaces, there would be thirty numbers on the indicator wheel 113. While any desired ratio of gearing and relative number of teeth may be employed, I have illustrated the toothed wheel 108 as having fifteen teeth, and as being geared one to four to the indicator wheel 113 by means of the beveled pinion 115. Thus four revolutions of the knob 111 are necessary to turn the indicator wheel once, and in turning such wheel once, the circuit closer 103 has been operated four times fifteen or sixty times. In order to complete the arrangement described, the ratchet wheel 74 is provided with sixty teeth, so that one revolution of the indicator wheel 113 results in energizing the magnet 80 sixty times and turning the ratchet wheel 74 through one complete revolution.

Assuming the parts to be at zero position, as would be usual at the beginning of a day, and assuming that it be desired to display the legend relating to the "Paoli Express", which legend is, we will say, the seventh on the web, the operator first turns the knob 111 until the numeral 7 appears in the window 112. In doing this, he has operated the circuit closer 103 fourteen times, and has stepped the ratchet wheel 74 forward a distance equal to fourteen teeth, or to what constitutes the seventh position, there being, in the embodiment shown, two teeth for each position. The ratchet wheel 74 carries with it the disc 72 and thus the contact finger 71 is set forward in a clockwise direction, or, in other words, angularly displaced to an extent equal to the fourteen teeth of the ratchet wheel. The operator then closes the switch 89, which, as indicated in Fig. 14, and also in Fig. 1, may conveniently be located at the remote control station adjacent the circuit closer 103. This is indicated by the dotted enclosure in Fig. 14.

The closure of the switch 89 supplies current to the motor 26 from one side of the line 88 through the switch or pair of contacts 95 and wire 97, the return being through either one or the other of the leads 98, 99, and wire 100, to the other side of the line. The motor then begins to run, and to wind the web from one reel onto the other. As it runs, the travel of the web over the guide roller 5 turns the pinion 61 and this drives the gear 62 and through pinion 65 the gear 66, thus carrying the contact segment 70 around, let us say, in a clockwise direction. After the web has travelled a distance corresponding to the predetermined setting or angular displacement of the contact finger 71, the disc 68 has been turned through a corresponding distance, and the contact 70 will have caught up to and registered with the contact finger 71, thus closing at this point the circuit supplying current to magnet 91.

But this circuit is open at another point, namely, the contacts 85, 86, these contacts being in series with the contacts 70, 71. Therefore, the magnet 91 is not necessarily energized at the exact moment of contact between the segment 70 and finger 71, but its energization depends upon the simultaneous closing of the contacts 85 and 86 also. It will be observed, by reference to Fig. 5, that these contacts are periodically closed at every half revolution of the disc 63, and by reason of the extremely high gear ratio between this disc and the disc 72, it comes about that the contacts 85 and 86 will necessarily be closed at least once between the initial engagement and final disengagement of the segment 70 and finger 71, this, of course, being due also to the substantial width of the latter.

Thus, as the web travels around the roller 5, the disc 63 measures off successive equal unit lengths of web and closes the contacts 85, 86 momentarily as each such unit length passes. Thus, in the example given, as six spaces or unit lengths of web have to pass over the roller 5 before the seventh desired space is reached, then the circuit is closed at 85, 86 six times (or it might be twelve times, dependent upon the gearing ratio employed). No effect, however, is produced by these periodic closings of the contacts 85, 86, so long as the finger 71 and segment 70 are not in engagement. When, however, to use the above illustration, the seventh space or unit length of web passes around the roller 5, the segment 70 and finger 71 are brought into engagement and during such engagement, the next notch 64 which passes the finger 87 will cause the contacts 85 and 86 to close, as usual, but this time the circuit of magnet 91 will be completed, the magnet will be energized, and the switch contacts 95 opened and the motor 26 stopped. Thus, the web is arrested with the desired legend or train information registering accurately with the display opening.

From the foregoing, it will be seen that the segment 70 and finger 71, which can be preset to any desired position, constitute a main or approximate governing device which serves to close the motor control circuit when the web reaches the desired position corresponding to that to which the finger 71 has been set, and that cooperating with this main governing device is a secondary or accurate governing device comprising the contacts 85 and 86 and the notched disc 63. It is obviously necessary to have a low gear ratio between the web and the segment 70, in order that the control contact 71 may be set to any desired angular position, and owing to this low gear ratio, it is obvious that if the contacts 70 and 71 were alone relied upon to stop the motor, it would be impossible to cause the legend on the web to register accurately with the display opening. The function of the secondary or auxiliary governing device, including the contacts 85, 86 is to secure the necessary accuracy in positioning the web. Since the periphery of the disc 63 travels at a speed which much more nearly approximates that of the web itself, it is clear that after the finger 87 enters a notch 64 and the motor stops, there can be exceedingly little drifting of the mechanism. In practice, I have found that it is possible to stop the web so accurately that there is a variance of not more than three-eighths of an inch from an exact line, one way or the other. To sum up, therefore, it will be seen that I provide a low geared governing device and a high geared governing device both of which cooperate in controlling the motor, and both of which must act jointly in order to stop it. No claim is made herein to the broad combination of main and secondary or auxiliary governing devices to control the motor, this subject matter being reserved for my application Serial No. 649,623, which is a division of my prior application above referred to. In this connection, it will be noted that in the present application the governing devices are operated by the guide roller and not by a reel itself. Consequently, their movement is at all times strictly proportional to the linear displacement of the web, a thing which is not true of the governing devices shown in my said prior application.

With the parts arranged as above described, it is obvious that after the contacts 70 and 71 have come into engagement and after the contacts 85 and 86 in series therewith have been simultaneously closed and the magnet 91 energized to open the motor circuit, this magnet will remain energized until the switch 89 is again opened. In order to avoid the necessity of the operator holding this switch closed until the motor stops, and then opening it again, I preferably employ a timing mechanism in connection with this switch, so that it will automatically open a certain number of minutes after it has been closed. With this type of switch, all the operator has to do is to close it, and he need then give it no further thought.

It will be observed that this switch 89 which controls the flow of current to the motor, is in series with the switch 95, and that in order to complete the motor circuit, both of these switches must be closed. It will also be observed that this switch 89 controls the supply of current over wire 90 to the magnet 91, as well as to the motor, so that when the switch 89 is opened the magnet 91 is deprived of current and permits the switch 95 to close. Thus, it will be seen that there are two switches in series in the motor circuit, one normally closed and the other normally open; that the closing of the normally open switch eventually operates through the governing devices to open the normally closed switch; and that the opening again of the first switch results in closing the other switch again.

Therefore, after the time mechanism has opened the switch 89, the parts are restored to normal condition. When it is desired to set the indicator to another position, it is only necessary to turn the knob 111 in the same direction and thus send out the requisite additional number of impulses to the magnet 80 to step around the control contact finger 71 to the new position. Then, upon closing the switch 89 again, the motor starts up and the mechanism operates as before.

Finally, it will be noted that, because of the ratchet wheel 108, the knob 111 can be turned in only one direction, and the ratchet wheel 74 always, of course, turns in the same direction. If, however, the indicator is at, say, legend number 25, and it is desired to set it to number 2, it is only necessary to turn the knob so as to carry the indicator wheel 113 on up to 30 and thence through zero to the numeral 2. After this has been done, and the motor is started up, it will serve first to drive the reel which is almost full of web, until position 30 is reached, and thereupon the direction of rotation of the motor will be automatically reversed by means of the reversing switch indicated at 53 in Fig. 14, and the reversal of the motor serves through the improved clutch mechanism shown in Figs. 6 to 9 to shift the drive from the full reel to the empty one, and the motor will continue running, winding the web backward from position number 30, until position number 2 is reached, whereupon it will be automatically stopped, as before. Thus, regardless of whether the next legend to be displayed is ahead of or behind the one already appearing at the display opening, it is only necessary to turn the knob 111 and the indicator wheel in the same direction until the desired number is reached, whereupon the motor, through the reversing switch and automatic clutch mechanism, will automatically take care of the situation and drive the web either directly or first in one direction and then in the other until the desired legend comes to display position.

No claim is made herein to the broad idea of automatically reversing the motor, as above described, this subject matter being also claimed in my said co-pending application, Serial No. 649,623, a division of my prior application, above referred to.

While I avail myself of the same idea of automatically reversing the motor just before the web is all unwound from one reel, as in my said prior copending application, it will be noted that in said prior arrangement, both reels are simultaneously driven and a reversible manually operated selector is employed, while in the present case, the reels are alternately driven, and the selector device or control can be moved in one direction only.

While I have shown and described the web 3 as bearing a series of signs or legends, each complete in itself, it will, of course, be appreciated that the same principle of operation may be employed regardless of the kind of information displayed. Therefore, where the word "legend" occurs in the claims, it is not to be understood as necessarily meaning a complete sign, as shown, but may include also a single letter, numeral or other character.

Referring again to the time indicator B, it will be understood that the remote control devices therefor may be located at any desired point, but preferably adjacent the devices 89 and 111, so that all apparatus will be accessible to the same operator. In case the train indicator control apparatus is mounted on the post or column A, as illustrated in Fig. 1, the time indicator control would be similarly located, and I have conventionally shown in Fig. 1 a group of time indicator control panels 116 similar to those disclosed in my prior copending application above referred to.

What I claim is:

1. In a changeable exhibitor, the combination with a web and a pair of reels to which the ends of said web are attached, of a reversible motor, driving mechanism interposed between said motor and reels including automatic means whereby one or the other of said reels is selectively and positively driven by said motor, dependent upon the direction of rotation thereof, and means for reversing said motor operated by said mechanism.

2. In a changeable exhibitor, the combination with a web and a pair of reels to which the ends of said web are attached, of a rotary member and means for driving it, a pair of gear members connected one with each reel, and a pair of one-way reversely disposed clutches one element of each of which is controlled by said rotary member, and the other element of each of which is rigidly secured to one of said gear members.

3. In a changeable exhibitor, the combination with a flexible travelling display element having thereon a plurality of legends, of a pair of rolls to which the ends of said element are attached, motor driven mechanism for rotating said rolls, a guide roller around which said display element passes, a governing device connected with said guide roller, means for setting said governing device to a predetermined position corresponding with that of a desired legend on said display element, means for putting said mechanism in operation, and means for automatically arresting said display element when it reaches a position corresponding with that to which said governing device has been set.

4. In a changeable exhibitor, the combination with a travelling display element having thereon a plurality of legends, an electric motor for driving said display element, a governing device connected with said display element, electrically operated means for shifting a member of said governing device to set it to a predetermined position corresponding with that of a desired legend on said display element, independent manually operated means for putting said mechanism in operation, and means for automatically opening the circuit of said motor when said display element reaches a position corresponding with that to which said member of said governing device has been set.

5. In a changeable exhibitor, the combination with a travelling display element having thereon a plurality of legends, of motor driven mechanism for moving said display element, a main governing device, an auxiliary governing device, both connected with said display element, means for shifting a member of said main governing device to set it to a predetermined position corresponding with that of a desired legend on said display element, means for putting said mechanism in operation, and means controlled by said auxiliary governing device for automatically arresting said display element when it reaches a position corresponding with that to which said member of said main governing device has been set.

6. In a changeable exhibitor, the combination with a travelling display element having thereon a plurality of legends, of motor driven mechanism for moving said display element, a main governing device, an auxiliary governing device both connected with said display element, a circuit closer operated independently by each device, a circuit controlling said motor and including both of said circuit closers in series, said circuit closers being normally open, means for shifting a member of said main governing device to set it to a predetermined position corresponding with that of a desired legend on said display element, means for putting said motor in operation, and automatic means controlled by the simultaneous closing of both of said circuit closers for stopping said motor and arresting said display element when it reaches a position corresponding with that to which said member of said main governing device has been set.

7. In a changeable exhibitor, the combination with a travelling display element having thereon a plurality of legends, of motor driven mechanism for moving said display element, means for putting said mechanism into operation, and means for automatically arresting it with a selected legend accurately positioned at a given point, said last mentioned means comprising an approximate governing device and means for shifting a member thereof so as to set said device to a predetermined position, an exact governing device, both of said devices being operatively connected with said display element, and means controlled jointly by the said two governing devices for stopping said motor when said display element reaches a position corresponding with that to which said approximate governing device has been set.

8. In a changeable exhibitor, the combination with a display element having thereon a plurality of legends, of motor driven mechanism for moving said display element, means for putting said mechanism into operation, and means for automatically arresting it with a selected legend accurately positioned at a given point, said last mentioned means comprising a main normally open circuit closer comprising a pair of independently movable contact members and means for automatically bringing said members into engagement after said display element has moved a predetermined distance, an auxiliary normally open circuit closer and automatic means for periodically closing it a plurality of times during the movement of said display element through such predetermined distance, and means responsive to the simultaneous closing of said circuit closers for stopping said mechanism.

9. In a changeable exhibitor, the combination with a travelling display element, of motor driven mechanism for moving the same, and means for controlling said mechanism so as to bring any selected part of said display element to a given position, said means comprising an electrically operated governing device and remote control step-by-step means for setting it to a predetermined position, said remote control means comprising a circuit closer, a circuit connecting said circuit closer with said governing device and including a source of current, manual means for actuating said circuit closer to transmit to said governing device any desired number of electrical impulses, and means associated with said manual means for indicating the position to which said governing device has been set.

10. In apparatus of the class described, an electric motor, a governing device mechanically connected with said motor and comprising a normally open circuit closer, means for setting said device to a predetermined position so that said circuit closer will close after said motor has made a certain number of revolutions, a manually operated switch in the circuit of said motor, a second normally closed switch also in said circuit, and means operated by the closing of said circuit closer for opening said second switch.

11. In apparatus of the class described, an electric motor, a source of current, and a control system for said motor comprising a normally closed switch interposed in circuit between said motor and source of current, an electromagnet which, when energized, serves to hold said switch open, a manually operated time-controlled switch also in said motor circuit in series with said first mentioned switch, and automatic means governed by said motor for energizing said magnet under predetermined conditions, the circuit through which said magnet is energized including said manually operated time-controlled switch, whereby, when said time-controlled switch opens, said magnet is deprived of current.

12. In a changeable exhibitor, the combination with a movable display element bearing a plurality of legends, and a reversible motor for driving said element, of an electrical selector device comprising a circuit controller and an indicator element having characters corresponding with the legends on said display element, manually actuated means for moving said indicator element in one direction only to select the desired legend and for simultaneously operating said circuit controller, and means whereby said motor is thus caused to move said display element in one direction only or first in one direction and then in the other to bring the desired legend into display position, in accordance with the particular legend selected.

13. In a changeable exhibitor, the combination with a movable display element bearing a series of legends of a selector device comprising an endless indicator element having a corresponding series of characters, manual means for advancing said indicator element in one direction only to successively select the characters desired, automatic means serving, if the character selected is at one side of the previous one, to move said display element in one direction and stop it with the legend corresponding with said character in display position, and automatic means serving, if the character selected is at the other side of the previous one, to move said display element first in one direction to the end of the series of legends, and then back in the opposite direction until the legend corresponding with the selected character reaches display position.

14. In a changeable exhibitor, the combination with a display element of definite length, bearing between its ends a series of legends, of a selector device comprising an endless indicator element bearing a corresponding series of characters, said display element being movable in both directions, and said indicator element being movable in one direction only, manual means for moving said indicator element to successively select the characters desired, and means automatically governed by said selector device for causing said display element to move so as to bring into display position the legend corresponding with the character selected, said movement being in one direction only or first in one direction and then in the other, in accordance with whether the character selected is in advance of or behind the previous one.

15. In a changeable exhibitor, the combination with a travelling display element having thereon a plurality of legends, of motor driven mechanism for moving said display element, a governing device connected with said mechanism, electrically operated means for shifting a member of said governing device, step-by-step, to set it to a predetermined position corresponding with that of a desired legend on said display element, manual means at a remote control station for controlling said electrically operated means, a power switch at said remote control station for causing the energization of said motor, and means for automatically depriving said motor of current when said display element reaches a position corresponding with that to which said member of said governing device has been set.

16. In a changeable exhibitor, the combination with a travelling display element having thereon a plurality of legends, of motor driven mechanism for moving said display element, means for putting said mechanism into operation, and means for automatically arresting it with a selected legend accurately positioned at a given point, said last mentioned means comprising an approximate governing device and means for shifting a member thereof so as to set said device to a predetermined position, an exact governing device, both of said devices being operatively connected with mechanism, and means controlled jointly by the said two governing devices for stopping said motor and arresting said display element when the latter reaches a position corresponding with that to which said approximate governing device has been set.

17. A changeable exhibitor comprising a pair of reels a web adapted to be wound upon said reels and having each end secured to one of said reels, a motor for driving said reels and mechanism interposed between said motor and said reels for reversing the direction of drive of said motor when the web becomes unwound from one of said reels, said mechanism comprising a main driving gear, geared to said motor, opposed pawls carried by said driving gear, ratchet wheels each geared to one of said reels mounted co-axially with said driving gear and adapted for engagement with said pawls, and a reversing switch driven directly by one of said ratchet wheels whereby the direction of rotation of the motor is reversed after a predetermined number of revolutions of said last-named ratchet wheel.

18. A changeable exhibitor comprising a pair of reels a web adapted to be wound upon said reels and having each end secured to one of said reels, a reversible motor for driving said reels and mechanism interposed between said motor and said reels for automatically reversing said motor when the web becomes unwound from either one of said reels, said mechanism comprising a shaft geared to a reversing gear a ratchet wheel secured to said shaft, a second ratchet wheel rotatably mounted upon said shaft, a main driving gear, driven by said motor, rotatably mounted upon said shaft between said ratchet wheels, and opposed pawls carried by said driving gear adapted for engagement with said ratchet wheels.

JOB HUTCHINSON.